(12) United States Patent
Sendrowicz

(10) Patent No.: US 7,760,645 B2
(45) Date of Patent: Jul. 20, 2010

(54) METHOD FOR ROUTING AD-HOC SIGNALS

(75) Inventor: Gerry Sendrowicz, Ottawa (CA)

(73) Assignee: Olsonet Communications, Ottawa, Ontario (CA)

( * ) Notice: Subject to any disclaimer, the term of this patent is extended or adjusted under 35 U.S.C. 154(b) by 1163 days.

(21) Appl. No.: 10/372,167

(22) Filed: Feb. 25, 2003

(65) Prior Publication Data

US 2003/0163554 A1    Aug. 28, 2003

Related U.S. Application Data

(60) Provisional application No. 60/358,703, filed on Feb. 25, 2002.

(51) Int. Cl.
   G06F 12/26 (2006.01)
   H04W 4/00 (2009.01)
(52) U.S. Cl. .................. 370/236; 370/252; 370/338
(58) Field of Classification Search ............. 455/456.1; 370/338, 406, 392, 395.54, 236, 252; 709/241
   See application file for complete search history.

(56) References Cited

U.S. PATENT DOCUMENTS

| | | | |
|---|---|---|---|
| 5,987,011 A * | 11/1999 | Toh | 370/255 |
| 6,028,857 A * | 2/2000 | Poor | 370/400 |
| 6,301,257 B1 * | 10/2001 | Johnson et al. | 370/392 |
| 7,159,035 B2 * | 1/2007 | Garcia-Luna-Aceves et al. | 709/241 |
| 7,184,421 B1 * | 2/2007 | Liu et al. | 370/338 |
| 7,366,113 B1 * | 4/2008 | Chandra et al. | 370/255 |
| 2002/0122410 A1 * | 9/2002 | Kulikov et al. | 370/349 |

OTHER PUBLICATIONS

Rohit Dube, Signal Stability Based Adaptive Routing for ad-hoc mobile networks. 1997 IEEE, pp. 36-45.*
Stefano Basagni, Mobile indepenednt flooding for real time multimedia applications in ad hoc networking, 1999, IEEE, pp. 1-5.*
Roy Leung, MP-DSR: A QOS aware multi-path dynamic source routing protocol for wireless ad-hoc networks. 2001, IEEE, pp. 132-141.*
Shih-Lin Wu, Route maintenance in a wireless mobile ad-hoc network, 2000, IEEE, pp. 1-10.*
S. Alagar, Reliable broadcast in mobile wireless networks, 1995, IEEE, pp. 236-240.*

(Continued)

*Primary Examiner*—Steven H Nguyen
(74) *Attorney, Agent, or Firm*—Perley-Robertson, Hill & McDougall LLP/s.r.l.

(57) ABSTRACT

An ad-hoc network is a typically a dynamic collection of nodes capable of communicating therebetween without the aid of pre-established infrastructure. Ad-hoc networks differ from traditional networks in that the topology of interconnections between nodes is inherently dynamic and not fixed. Generally, the routing protocols belong to two groups: proactive and reactive. Proactive protocols attempt to maintain correct and up-to-date routing information at every node. Reactive protocols, in turn, collect necessary routing information only if a pair of nodes are to establish a communication. In accordance with embodiments of the invention a reactive ad-hoc network protocol is disclosed that uses controlled flooding to broadcast packets of information within the ad-hoc network. Furthermore, the ad-hoc network protocol does not maintain up-to-date routing information at every node in an ad-hoc network and does not utilize specific control messages to assure that packets within the ad-hoc network follow optimal paths.

15 Claims, 12 Drawing Sheets

OTHER PUBLICATIONS

David Johnson, The Dynamic Source Routing Protocol for Mobile Ad Hoc Networks (DSR), Feb. 21, 2002, IETF, pp. 1-85.*

David Johnson, The Dynamic Source Routing Protocol for Mobile Ad Hoc Networks (DSR), Feb. 21, 2002, IETF, pp. 1-64.*

Chen, T.W. and Gerla, M. "Global State Routing: A New Routing Scheme for Ad-Hoc Wireless Networks", proceedings of IEEE ICC '98.

Chiang, C.C. and Gerla, M. "On-Demand Multicast in Mobile Wireless Networks", proceedings of ICNP '98.

Murthy, S. and Garcia-Luna-Aceves, J.J. "An Efficient Routing Protocol for Wireless Networks", ACM MONET 1(2): 183-197 (1996).

Toh, C.K. "A Novel Distributed Routing Protocol to Support Ad-Hoc Mobile Computing", proceedings of 15th IEEE, Annual International Phoenix Conference on Computers and Communications (1996), 480-486.

Johnson, D.B. and Maltz, D.A. "Dynamic Source Routing in Ad Hoc Wireless Networks", Mobile Computing, vol. 353, 1996.

* cited by examiner

| If the *transmission time buffer* is empty, then: |
|---|
|     Store ID and the current time $t_{cur}$ in the buffer |
| Else |
|     Let $t_b$ be the time at which an entry was made in *transmission* time buffer |
|     Let $t_{cur}$ be the current time |
|     If $t_{cur} - t_b > T_b$, then: |
|     Double $T_b$ |
|     Clear the contents of *transmission time buffer* |
| Fetch values of $\bar{h}$ and $\bar{m}$ from SPD *buffer*, set $m$, and $h = 0$ |
| Assign these values to corresponding fields of the packet |
| Call function *dupDiscardAlg(ID, r, h, $t_{avg}$)* |
| Pass the packet to the Data Link Layer that broadcasts it to neighbour(s) |

FIG. 5a

| Let $t_{avg}$ be the current average transmission time |
|---|
| Let $t_t = 0$ |
| If $(ID = ID_b)$, then: |
|     Call *getTransmissionTime(ID, $t_{avg}$)* band assign its return value to $t_t$ |
|     Clear the contents of the *transmission time buffer* |
|     If the Data Link Layer returns *DLSuccTrans(ID)*then: |
|     If $t_t > 0$, then: |
|     Call function *avgTransmissionTime( $t_t$, $t_{avg}$)* and assign uts return value to $t_{avg}$ |
|     Return message *NLSuccTrans(ID)* to the Transport Layer |
| Else // *DLFailTrans(ID) is returned* |
|     Return message *NLFaiTrans(ID)* to the Transport Layer |

FIG. 5b

```
Let the average transmission time (stored in memory) at this station be t_avg
Call function dupDiscardAlg(ID, r, h, t_avg)
If the function returns ret_dupentry, then:
        Discard the packet
Else // ret_newentry is returned
        switch (D):
                case K: // D=K means that K is a sole destination of the packet
                case 0: // D=0 means that the packet is broadcast
        Extract fields h and m
        Store them in SPD buffer ash h̄ and m̄
                Pass the packet's payload to the Transport Layer
        If(D == K)
                Discard the packet
        Else
                Pass the packet to the Data Link Layer that broadcasts it to
                neighbour(s)
                Increment hop counter h
break;
default: // D ≠ 0 means that K is not a receiver of the packet
        Call function subPathDiscardAlg(S, D, h, h̄, m̄)
        If the function returns ret_discard, then:
                Discard the packet
        Else
                Increment hop counter h
                If the value of h exceeds the maximum renge r, then:
                        Discard the packet
                Else
                        Pass the packet to the Data Link Layer that broadcasts
                        it to neighbor(s)
```

FIG. 5c

Let $t_{avg}$ be the current average transmission time
Let $t_t = 0$
If($ID == ID_b$), then:
    Call *getTransmissionTime(ID, $t_{avg}$)* and assign its return value to $t_r$
    Clear the contents of *transmission time buffer*
If the Data Link Layer returns *DLSuccTrans(ID)*, then:
    If $t_r > 0$, then:
        Call function *avgTransmissionTime($t_r, t_{avg}$)* and assign its return
            value to $t_{avg}$

FIG. 5d

Let *ID* contain id *S* of a source and id *D* of a destination
Remove entry [*ID*, $t_r$] from the *DD cache*
If this was the last entry with *ID*, then:
    Find entry *E* in the *SPD cache* that has *S* and *D* in it
    If the entry is found, then:
        Let *ID'* contain id *D* of a source and id *S* of a destination
        If the *DD cache* does not contain entry [*ID'*, $t_r$], then:
            Remove entry *E* from the *SPD cache*
            Remove entry [*D, h, m*] from the *SPD buffer*

FIG. 5e

Calculate $T_r$ using $h$, $r$, and $t_{avg}$
Calculate $t_r$ as a sum of $T_r$ and the current time
If the entry containing *ID* exists in the *DD cache*, then:
    Refresh that entry., replace the old time $t_r$ with the new one
    Return *ret_dupentry*
Else
    If there is no space for the entry in the cache, then:
        Find the oldest entry that contains [*S, D, s*]
        If such an entry is not found, then:
            Find the globally oldest entry
        Remove the found entry
    Add entry [*ID, $t_r$*] to the *DD cache*
    Return *ret_newentry*

FIG. 6a

Let *ID* be the identifier stored in the *transmission time buffer*, and $t_b$ be the time at which it was stored
Let $t_t = 0$
If ( *ID* == $ID_b$ ), then:
    Calculate time $t_t = t_{cur} - t_b$
    Set $T_b = 2 \times t_{avg}$
Return $t_t$

FIG. 6b

```
Let the id of the station running this algorithm be K
If the SPD cache contains entry [S, D; h_sk, C_ds; h_dk, C_sd], then:
    h_sk = h
Else
    Create new entry [S, D; h_sk = h, C_ds = 0; h_dk = 0, C_sd = 0]
Let C_ds^old = C_ds
If h_dk > 0, then:
    If h̄ > 0 and h̄ < h_dk + h_sk, then:
        C_ds = m̄ x[(h_sk + h_dk)-h̄]
    else
        C_ds = 0
If C_ds^old > and > 0, then:
    Call function    deterministicDiscard(C_sd) or
                     probabilisticDiscard(C_sd)
    Return the value (ret_discard or ret_keep) returned by the called
    function
Else
    h̄ = h_sk + h_dk
    Store the new value of h̄ in the packet
        Return ret_keep
```

FIG. 6c

```
If C_sd > 0, then:
    Decrement C_sd
    Return ret_discard
Else
    Return ret_keep
```

FIG. 6d

```
If Csd > 0, then:
    Decrement Csd
    Let Pdisc = Csd/C_sd^init
    Return ret_keep with probability Pdisc; and ret_discrard with
    probability 1- Pdisc
Else
    Return ret_keep
```

```
Let tavg be the current average transmission time
The new value of tavg is;
tavg = Cavg x tavg + (1- Cavg) x tt
Return tt
```

| SPD source cache at: | $\overline{h}$ | $\overline{m}$ |
|---|---|---|
| D | 0 | 0 |
| S | 2 | 1 |

| SPD cache at node x, where x is: | $h_{sx}$ | $C_{ds}$ | $h_{dx}$ | $C_{sd}$ |
|---|---|---|---|---|
| M | 0 | 0 | 1 | 0 |
| L | 0 | 0 | 2 | 0 |
| K | 0 | 0 | 3 | 0 |

| SPD source cache at: | $\overline{h}$ | $\overline{m}$ |
|---|---|---|
| D | 2 | 1 |
| S | 2 | 1 |

| SPD cache at node x, where x is: | $h_{sx}$ | $C_{ds}$ | $h_{dx}$ | $C_{sd}$ |
|---|---|---|---|---|
| M | 3 | 2 | 1 | 0 |
| L | 2 | 2 | 2 | 0 |
| K | 1 | 2 | 3 | 0 |

| SPD cache at node x, where x is: | $h_{sx}$ | $C_{ds}$ | $h_{dx}$ | $C_{sd}$ |
|---|---|---|---|---|
| M | 3 | 2 | 1 | 2 |
| L | 2 | 2 | 2 | 2 |
| K | 1 | 2 | 3 | 2 |

FIG. 9e

| SPD cache at node x, where x is: | $h_{sx}$ | $C_{ds}$ | $h_{dx}$ | $C_{sd}$ |
|---|---|---|---|---|
| M | 3 | 2 | 1 | 2 |
| L | 2 | 2 | 2 | 2 |
| K | 1 | 2 | 3 | 2->1 |

FIG. 9f

| SPD cache at node x, where x is: | $h_{sx}$ | $C_{ds}$ | $h_{dx}$ | $C_{sd}$ |
|---|---|---|---|---|
| M | 3 | 2->1 | 1 | 2 |
| L | 2 | 2 | 2 | 2 |
| K | 1 | 2 | 3 | 1 |

FIG. 9g

| SPD cache at node x, where x is: | $h_{sx}$ | $C_{ds}$ | $h_{dx}$ | $C_{sd}$ |
|---|---|---|---|---|
| M | 3 | 0 | 1 | 2 |
| L | 2 | 2 | 2 | 2 |
| K | 1 | 2 | 3 | 0 |

FIG. 9h

METHOD FOR ROUTING AD-HOC SIGNALS

This application claims priority from U.S. Provisional Application Ser. No. 60/358,703 filed Feb. 25, 2002.

FIELD OF THE INVENTION

The present invention relates to data communication networks and more specifically to a method of routing messages using an ad-hoc data communication network having flexible network topology.

BACKGROUND OF THE INVENTION

An ad-hoc network is a typically a dynamic collection of nodes capable of communicating therebetween without the aid of pre-established infrastructure. Ad-hoc networks differ from traditional networks in that the topology of interconnections between nodes is inherently dynamic and not fixed. Consequently, ad-hoc networks do not rely on a centralized authority in order to coordinate the communication between the nodes.

A number of routing protocols used to implement ad-hoc networks have been presented in the literature. Generally, the routing protocols belong to two groups: proactive and reactive. Proactive protocols attempt to maintain correct and up-to-date routing information at every node. This information is then used to establish connections between the nodes that wish to communicate. Reactive protocols, in turn, collect necessary routing information only if a pair of nodes are to establish a communication.

Many existing ad-hoc network protocols are rather complex, which seems to be one of the reasons why ad-hoc devices utilizing ad-hoc protocols are not widely available. Considering a highly dynamic nature of ad-hoc networks, that frequent change in their topology, it is the opinion of those of skill in the art that reactive protocols are more suitable for use in this environment. Furthermore, overhead associated with maintaining up-to-date routing information at every node in an ad-hoc network is known to be expensive.

The dynamic environment of ad-hoc networks calls for new routing protocols to be implemented, since the traditional routing protocols are not current with frequent topology changes that occur in ad-hoc networks.

OBJECT OF THE INVENTION

It is an object of this invention to provide a method of routing signal data using a wireless ad-hoc network in which network topology changes are frequent

SUMMARY OF THE INVENTION

In accordance with a preferred embodiment of the present invention, there is provided a method of providing a reactive ad-hoc network comprising the steps of:
  providing data to a first node for transmission therefrom;
  providing an indication of a destination node;
  transmitting the data from the first node in a broadcast fashion;
  receiving the data at a second other node; and
  retransmitting the data from the second other node for some received data and not for others and only when predetermined criteria are other than met for providing controlled flooding.

In accordance with another preferred embodiment of the present invention, there is provided a method of providing a reactive ad-hoc network comprising the steps of:
  providing data to a first node for transmission therefrom;
  providing an indication of a destination node;
  transmitting the data from the first node to the destination node via a second other node other than the first node or the destination node absent a known available route.

BRIEF DESCRIPTION OF THE DRAWINGS

Exemplary embodiments of the invention will now be described in conjunction with the following drawings, in which:

FIG. 5a illustrates a flowchart of the PacketTransmission process;

FIG. 5b illustrates a flowchart of the PacketTransmissionResult process;

FIG. 5c illustrates a flowchart for the PacketFwdRcv process;

FIG. 5d illustrates a flowchart for the PacketFwdRcvResult process;

FIG. 5e illustrates a flowchart for the CacheTimer process;

FIG. 6a illustrates a flowchart for the dupDiscardAlg function;

FIG. 6b illustrates a flowchart for the getTransmissionTime function;

FIG. 6c illustrates a flowchart for the subPathDiscardAlg function;

FIG. 6d illustrates a flowchart for the deterministicDiscard function;

FIG. 9a illustrates a table showing SPD source cache entries for nodes D and S for a packet p1 sent by D to S and arriving at node S;

FIG. 9b illustrates the SPD cache entries at nodes K, L, and M;

FIG. 9c illustrates a reverse of that shown in FIG. 9a, where a packet p2 of a reverse communication session from S to D arrives at node D;

FIG. 9d illustrates the SPD cache entries at nodes K, L, and M, where the packet traveling from nodes S to D carries values of path $\bar{h}=2$ and mobility factor $\bar{m}=1$;

FIG. 9e illustrates further SPD cache entries at nodes K, L, and M where a packet p3 is sent by nodes D to S for arrival at node S;

FIG. 9*f* illustrates the SPD cache at nodes K, L, and M, where a packet p4 of a reverse communication session from nods S to D arrives to node D;

FIG. 9*g* illustrates the SPD cache at nodes K, L, and M, where a packet p5 sent by node D to node S arrives at S;

FIG. 9*h* illustrates the SPD cache 401 at nodes K, L, and M, where after transmission of packet p6 from S to D, packet p7 from D to S, and packet p8 of a reverse communication session from S to D; and, FIG. 10 illustrates an example where setting F(p) to its maximum value of p−1 is potentially beneficial.

DETAILED DESCRIPTION OF THE INVENTION

Figure 1:
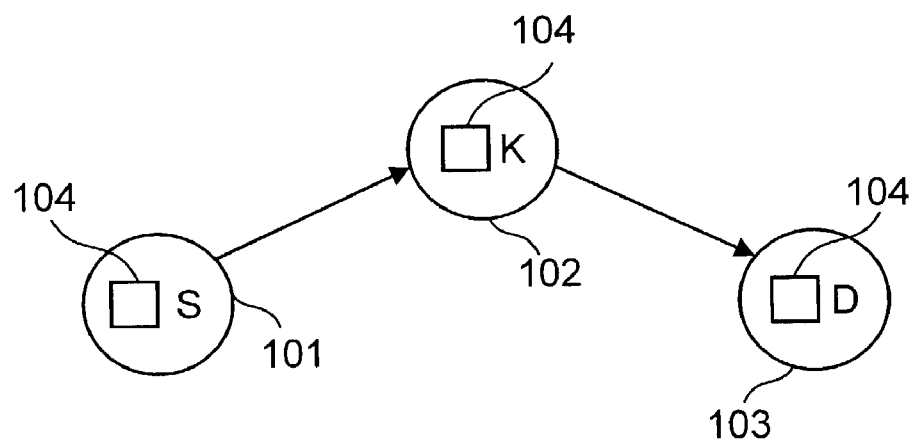
FIG. 1 is a simplified diagram of an ad-hoc network.

Typically, an ad-hoc network (AHN) offers the possibility to connect large numbers of communication devices, in the form of nodes, without significant infrastructure costs. Each node within the AHN has three functions. As is illustrated in FIG. 1, a node is either for being a source 101 of signal data transmitted through the AHN, a final destination 103 of signal data transmitted through the ad-hoc network, or a relay 102 for propagating signal data between two nodes. Through ad-hoc networks various types of signal data are transmittable from one node to another node as long as the nodes are in transmission and reception range with each other. Node K 102 is intermediate to nodes S and D, and therefore packets from nodes S to D, or D to S, are preferably propagated through node K.

Ad-hoc networks are dynamic networks that support moving, removing and addition of nodes therein. Typically, prior art AHN require large bandwidth nodes to manage signals propagating between the nodes thereof.

Referring to FIG. 1, a simplified diagram of an ad-hoc network is shown. The network comprises a source node 101, a destination node 103 and an intermediary node 102. As is well known in the art, there may be any number of intermediary nodes. Each intermediary node is provided with wireless communication hardware for transmitting, receiving, and relaying of data.

To overcome drawbacks, of prior art ad-hoc networks, the ad-hoc networks preferably provide a method of preventing bottlenecks as a result of signal routing for use in directing relayed signals toward an intended destination. This is particularly useful in proactive ad-hoc networks. Unfortunately, these methods of implementing signal extinction are often cumbersome and require significant processing power and system resources.

The present invention as described herein with reference to particular embodiments thereof is in reference to a protocol, in the form of a tiny ad-hoc routing protocol (TARP) for routing ad-hoc signals within the ad-hoc network. Preferably, the embodiments of the invention allow for transmitting and receiving of signals within the AHN with a limited bandwidth. Further preferably, the protocol functions with the use of a relatively small capacity memory 104 disposed in each node for storing executable instructions for implementing of the protocol.

Figure 2:
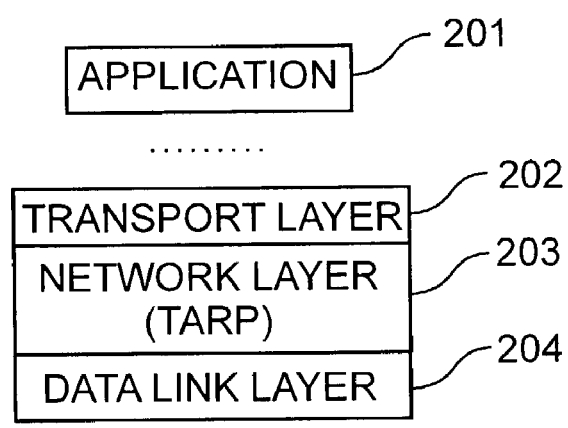
FIG. 2 illustrates a simplified diagram of an application layer, a transport layer, a Network Layer 203, including the TARP, and a data link layer 204, in accordance with an embodiment of the invention.

Referring to FIG. 2, a simplified diagram of an application layer 201, a Transport Layer 202, a Network Layer 203, including the TARP, and a data link layer 204, in accordance with an embodiment of the invention, are shown. The TARP is described hereinbelow with the use of the following functions, processes and processes.

The idea behind TARP is based on a process termed "controlled flooding." When a node sends a packet, the packet broadcasts it to neighbouring nodes, where this approach is particularly natural is in wireless networks where all received nodes are sufficiently close to a transmitter in order to receive the transmission.

A node receiving the packet determines from a destination field of the packet whether it is an intended receiver of the packet and the node receives the packet. In the process of receiving the packet by the node, a payload of the packet is provided to the Transport Layer 202.

Otherwise, the node uses processes in accordance with embodiments of the invention to limit a number of packets in the network. These processes are: a Duplicate Discard (DD) process and a Sub-optimal Path Discard (SPD) process, which are described hereinbelow.

Figure 3A:
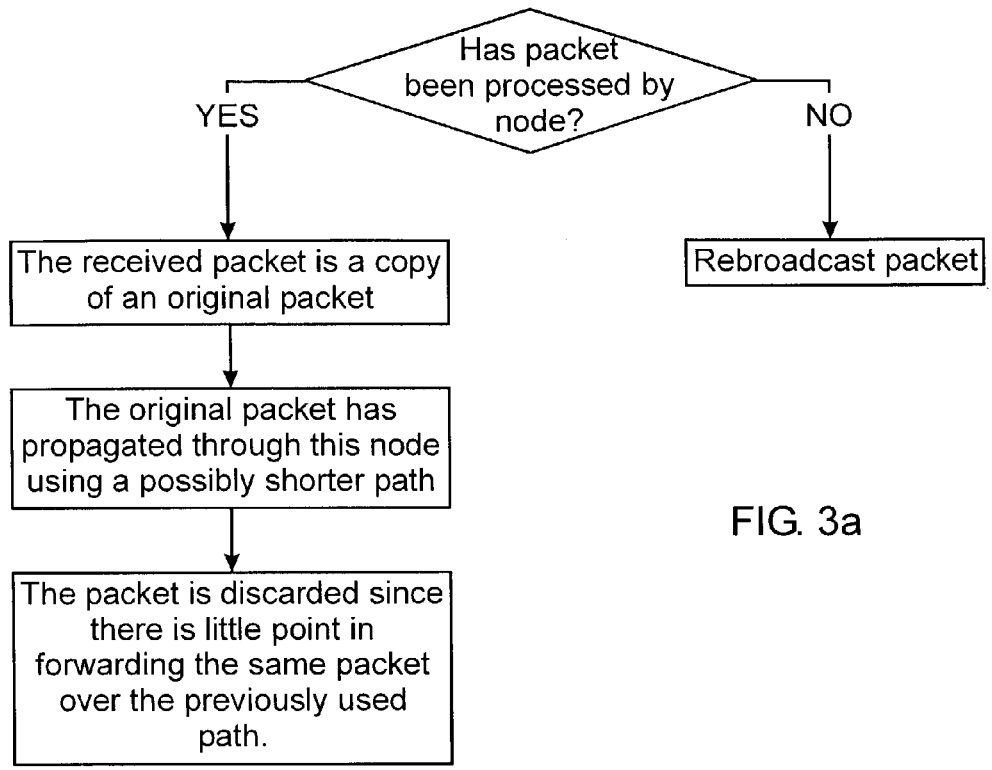
FIG. 3a illustrates a Duplicate Discard (DD) process steps.

In execution of the DD process, as illustrated in FIG. 3*a*, a node checks the packet in order to determined if it has already processed the packet. If the answer is no, the packet is rebroadcast from this node, otherwise, the received packet is a copy of an original packet. The original packet has propagated through this node using a possibly shorter path. Thus, the packet is discarded since there is little point in forwarding the same packet over the previously used path.

Figure 3B:
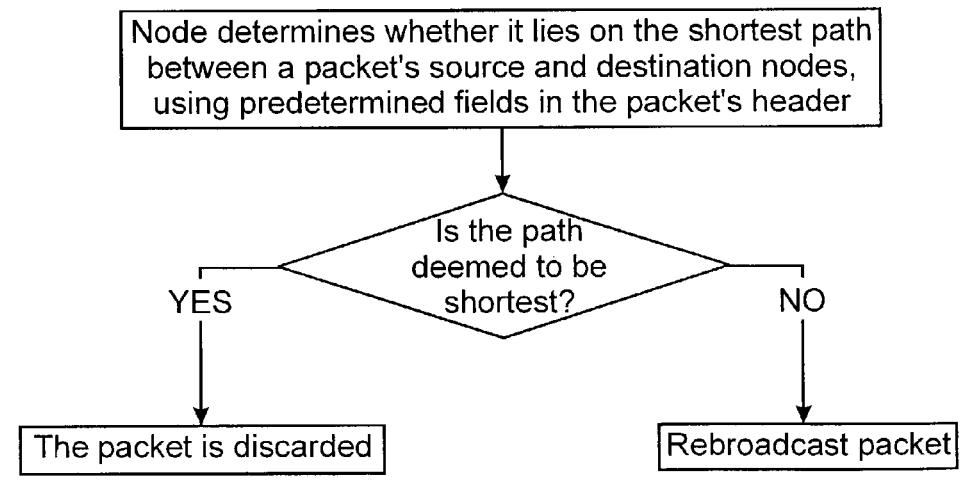
FIG. 3b illustrates a Sub-optimal Path Discard (SPD) process steps.

In the SPD process, as illustrated in FIG. 3*b*, a node determines whether it lies on the shortest path between a packet's source and destination nodes, using predetermined fields in the packet's header. If the path is deemed to be shortest, the packet is rebroadcast from this node. Otherwise, the packet is discarded. There is little point in forwarding a packet that has a high probability of being discarded by a destination node since it is a duplicate. Typically, this occurs when a copy of that packet arrived at a destination node faster after having propagated using a shorter path.

In order for a node to determine that the received packet is a duplicate in implementing of the DD process, the packet preferably stores certain information therein relating to its predecessor node. It is preferable for the node to determine a sufficient timeout after which the packet is deleted. If the packet is kept for too long in the node, the memory requirements for the potentially increase. If the packet is deleted too early, a packet's duplicate is potentially propagated in the AHN, thus potentially wasting AHN bandwidth.

In implementing of the SPD process, a node discards packets sent by a given source node once it has determined that it is not located on the sub-optimal path. At some point, however, the node resumes forwarding packets. The SPD process thus dynamically determines a predetermined amount of time for which packets are discarded.

Packet Format

Each packet propagated in the AHN comprises fields listed hereinbelow. The Network Layer 203 header of every packet contains the following fields: [ID, r, h, $\bar{h}$, m, $\bar{m}$], where the packet id is determined from the following: ID=S, D, s, n, k, where:

S—source node of a packet

D—destination node of a packet; if D=0, then the packet is broadcast s—identifier unique for a communication session from S to D n—sequential number of a packet sent by S to D during a communication session whose identifier is s k—transmission number of a packet identified by S, D, s and n that allows the Network Layer 203 to distinguish retransmissions of the same packet r—the maximum range of a packet expressed in hops, a packet is removed from the network when h=r h—hop counter that measures the number of hops that a packet has traveled so far (h=0 at a source)

$\bar{h}$—the number of hops traveled by the last packet on the reverse path from D to S m—mobility factor to be used by the SPD process for communication session from S to D $\bar{m}$—mobility factor to be used by the SPD process by a reverse communication session from D to S (both m and $\bar{m}$ are short—2, 3 bits)

The last four fields are used by Sub-optimal Path Discard (SPD) process that discards packets relayed over a sub-optimal path. If D=0, the packet is delivered to all destinations nodes that are no further than r hops away from source S. This provides the broadcasting capability to the TARP. More on the SPD process is described hereinbelow.

Control Messages

Control messages are exchanged between Transport Layer 202, Network Layer 203 and Data Link Layer 204. The purpose of these control messages is to notify the protocols in execution within the Network Layer 203 and in the Transport Layer 202 about whether the transmission of a packet to a neighboring node was a success or not.

DLSuccTrans(ID) and DLFailTrans(ID) are control messages that are received by the Network Layer 203 (TARP) from the Data Link Layer 204, where: A DLSuccTrans(ID) message indicates that the Data Link Layer 204 successfully sent a packet identified by ID. Thus, a neighboring node received the packet. A packet is optionally successfully received by several neighboring nodes, where each of these events generates a separate DLSuccTrans message. A DLFailTrans(ID) message indicates that the Data Link Layer 204 was unable to send a packet identified by ID. This message is generated when the Data Link Layer 204 generates a time out signal waiting for an acknowledgement of packet receipt from any neighboring node.

NLSuccTrans(ID) and NLFailTrans(ID) are messages that are provided from the Network Layer 203 (TARP) 203 to the Transport Layer 202, where: a NLSuccTrans(ID) message corresponds to the DLSuccTrans(ID) message and is triggered by the DLSuccTrans(ID) message. A NLFailTrans(ID) message corresponds to the DLFailTrans(ID)) message and is triggered by the DLFailTrans(ID) message.

Timing Parameters

Various timing parameters are used for implementing of the TARP and are defined hereinbelow.

Figure 4:
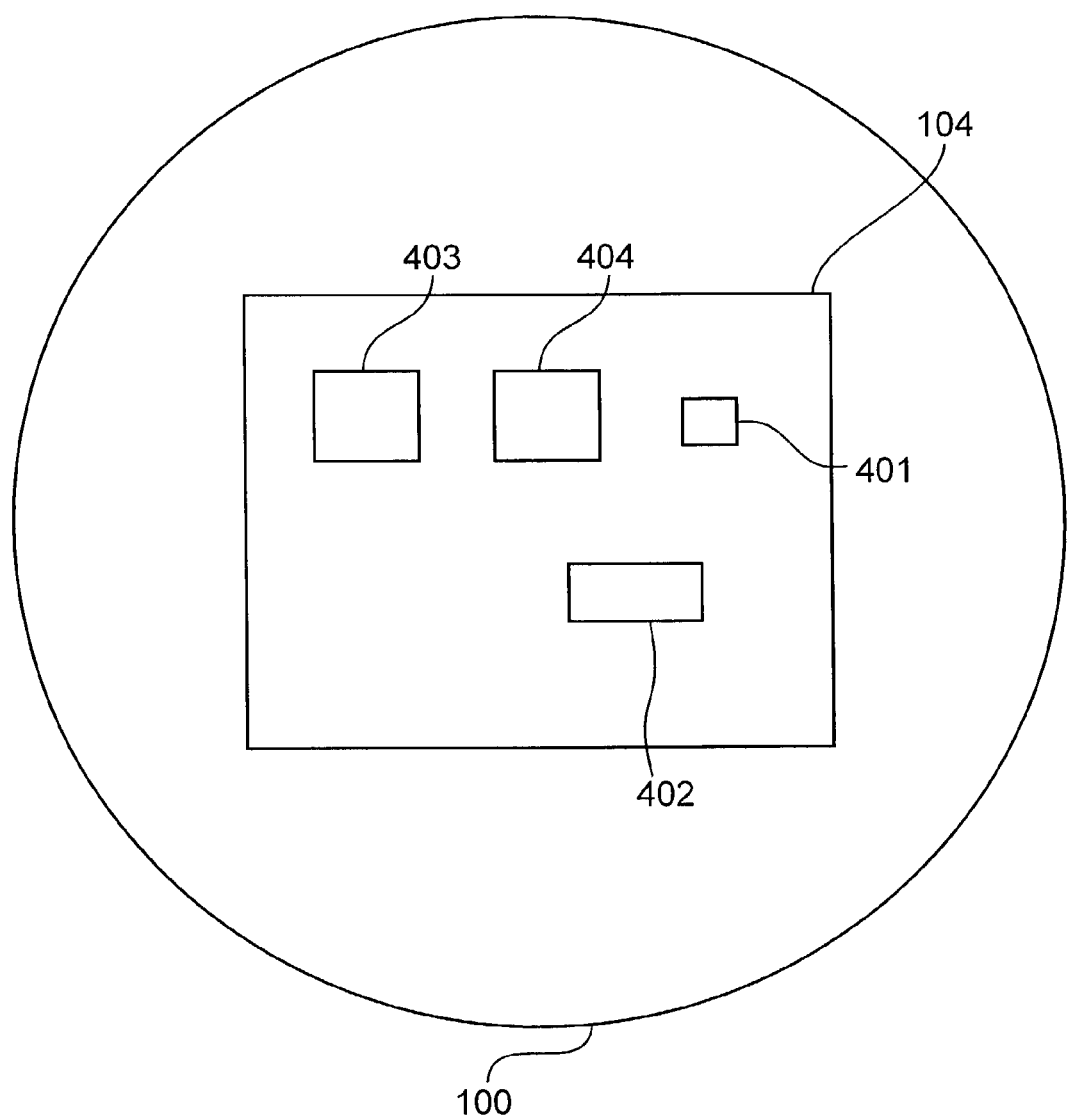
FIG. 4 illustrates a node in the AHN having memory therein for storing of cache data.

$\Delta t_f$—transmission time, the time between when a packet is provided to the Data Link Layer and when the Data Link Layer returns a message that indicates that the packet was received by a neighboring node $\Delta t_{avg}$—average transmission time of a packet $t_{cur}$—the current time $\Delta T_r$—time for which an entry is kept in a DD cache;

$t_r$—time at which a DD cache entry is to be deleted, if an entry is deleted at a current time $t_{cur}$, the entry in the DD cache was made at time $\Delta t_r$-$\Delta T_r$ $\Delta T_b$—time for which an entry is kept in a transmission time register $t_b$—time at which an entry is made in a transmission time register DD Cache In accordance with that illustrated in FIG. 4, a DD cache 403 is for use by the Duplicate Discard (DD) process. Nodes executing the TARP do not maintain routing tables therein, thus no information about the propagation path is kept. Instead, each node 100 is provided with a routing cache memory 104, the purpose of which is to keep certain entries that are used to identify packets that propagate therethrough.

The DD cache 403 is implemented as a routing cache in the TARP protocol. Storing of some entries within the DD cache 403 allows a node to delete duplicate packets according to the Duplicate Discard process. Preferably the DD cache 403 entry stores the ID of a packet and the time t, at which the stored ID of a packet is to be deleted.

Transmission Time Register

A transmission time register 404 is used by a transmitter node to calculate a transmission time $\Delta t_f$ for the packet. The transmission time is calculated as a difference between a time at which the packet ID is provided to the Data Link Layer 204 and the time at which the Data Link Layer 204 returns a message that the packet is received by a neighboring node. The transmission time is further used to measure an average transmission time $\Delta t_{avg}$, and calculate the time $t_r$ at which DD cache 403 entries are to be deleted, where the DD process utilizes this transmission time.

Unlike the DD cache 403, the size of transmission time register 404 is typically sufficient to store an entry corresponding to only one packet. Specifically, the entry comprises the ID of a packet and time $t_b$ at which this entry was stored into the transmission time register 404.

An entry from the transmission time register 404 is deleted when time $\Delta T_b$ expires, where this time $\Delta T_b$ is dependent upon the average transmission time $\Delta t_{avg}$.

SPD Cache

An SPD cache 401 is used by the Sub-optimal Path Discard (SPD), where an entry in this cache for use by an intermediate node K (FIG. 1) has the following fields:

identification S of a node identification D of a node number of hops $h_{dk}$ between D and the intermediate node K, where this entry is a result of the most recent packet sent by D and addressed to S when it propagated through the intermediate node discard counter $C_{sd}$ to be used by the process to control the flow from S to D number of hops $h_{sk}$ between S and the intermediate node K, where this entry is the result of the most recent packet sent by S and addressed to D when it propagated through the intermediate node discard counter $C_{ds}$ to be used by the process to control the flow from D to S Every node stores a single entry [S, D; $h_{sk}$, $C_{ds}$; $h_{dk}$, $C_{sd}$] that is used by two sessions between nodes: the one from S to D, and the one from D to S. Fields $h_{dk}$ and $C_{sd}$ are used by a S to D communication session, while fields $h_{sk}$ and $C_{ds}$ are used by a D to S communication session. In this manner, only a single entry is stored for packets propagating from S to D, and from D to S.

Every consecutive packet from S to D, or from D to S, alters the contents of the SPD cache entry. Specifically, a packet sent by S to D updates fields $h_{sk}$ and $C_{ds}$, which are used by the SPD process to control packet traffic flowing from D to S. Packets sent by D to S update fields $h_{dk}$ and $C_{sd}$, which are use to control packet traffic propagating from S to D. Of course, the time at which a given entry in the SPD cache 401 is deleted depends on the corresponding contents of the DD cache.

SPD Source Cache

Similar to the SPD cache 401, an SPD source cache 402 is used by the Sub-optimal Path Discard (SPD) process, where the SPD source cache 402 stores an entry in its buffer in dependence upon each destination node to which a packet is transmitted. Thus, if source S transmits to three different destination nodes, three different entries are stored in the buffer.

The format of an entry stored in the buffer is as follows: ID of a destination node D, a number of hops $\bar{h}$ traveled by the latest packet from D to S, and mobility factor $\bar{m}$ of the packet for used by the SPD process for packet exchange from S to D. Similar to the SPD cache 401, the time at which a given entry is deleted from SPD source cache 402 depends on the corresponding contents of a DD cache 403.

Node Processes

Each node 100 executes independent processes, illustrated in FIG. 5, such as: a PacketTransmission process, PacketTransmissionResult process, PacketFwdRcv process, PacketFwdRcvResult process, and a CacheTimer process, described hereinbelow.

PacketTransmission

This process transmits a new packet with entries [ID, r, h=0, $\bar{h}$, m, $\bar{m}$] from a source node S. A packet being received from the Transport Layer 202 triggers the PacketTransmission process. A flowchart of the PacketTransmission process is illustrated in FIG. 5a.

This process waits for a new packet from the Transport Layer 202. As soon as this new packet arrives, the process checks if an entry in the transmission time register 404 is empty. The Transmission time register 404 stores at most one entry that comprises the ID of a packet and the time at which that entry was made. The entry is made when the packet that is distinguished by ID is provided to the Data Link Layer 204.

As mentioned before, the transmission time register 404 is used to measure a transmission time $\Delta t_r$, which is the earliest time it takes the Data Link Layer 204 to successfully transmit a packet to a neighboring node. Of course, since there is only space for only one entry in this register 404, not every packet sent by a transmitting node takes part in these measurements.

If the transmission time register 404 is non-empty, it means that the PacketTransmission process has already provided a packet to the Data Link Layer 204, and the Data Link Layer 204 has not yet responded with a message indicating whether the packet was received by a neighboring node or not. Thus, the Data Link Layer 204 is still busy transmitting a previous packet. In such a case, the process fetches the time $t_b$ from the transmission time register 404, and calculates the time that has elapsed since then. If this time is greater than the maximum time $\Delta T_b$ for which the entry is to be stored in the register 404, a time for $\Delta T_b$ has not been determined properly. Thus, $\Delta T_b$ is doubled and the transmission time register's 404 content is cleared.

If the transmission time register 404 is empty, the ID of a packet and the current time are stored in the transmission time register 404, and the values of $\bar{h}$ and $\bar{m}$ are then fetched from the SPD source cache 402. These values are the number of hops and a mobility factor, respectively, resulting from the last packet sent by destination node D and received by source node S. These two values correspond to a reverse communication session from nodes D to S and the SPD process uses these values.

The other two fields are number of hops h that a packet from nodes S to D has propagated, if the value for this field is 0, then the mobility factor m to be used by the SPD process is for a communication session from S to D. Optionally, mobility factor m is one of the TARP's modes of operation with a default value of 1.

Finally the process implements function dupDiscardAlg( ), that implements the DD process. The purpose of this function is to assure that if the packet being transmitted returns to the source S, for example the packet is bounced back by the immediate neighbouring node, it is discarded as a duplicate. When function dupDiscardAlg( ) is called by PacketTransmission process, the function only inserts a packet to the DD cache 403. A call to dupDiscardAlg( ) made by process PacketFwdRcv, that forwards and receives packets, is used to detect whether the received packet is a duplicate.

The function uses the estimate of the average transmission time $\Delta t_{avg}$, stored by every node 100, and furthermore, at the end of this process, the packet is provided to the Data Link Layer 204.

PacketTransmissionResult

The PacketTransmissionResult process determines whether a neighbouring node successfully receives a packet originated in the node and passed to the Data Link Layer 204. The steps for this process are outlined in FIG. 5b, where the result of this process is provided to the Transport Layer. This process is triggered by control message DLSuccTrans(ID) or DLFailTrans(ID) received from the Data Link Layer 204, and the ID of a packet comprises the identification of a node executing this process, where the node in execution of this process if the source of the packet.

This process waits for a control message from the Data Link Layer 204 that concerns packet ID that had been passed there by the Network Layer 203. It all happens at the source of packet ID.

First, the current estimate of the average transmission time is fetched from the node's memory 104. Then, ID of a packet that the control message concerns is compared with identification $ID_b$ stored in the transmission time register 404. If the entries match, the transmission moment of the ID packet is calculated by function getTransmissionTime( ) and the contents of the register 404 is cleared since it is no longer needed.

The purpose of this function is to calculate the time between the moment at which the packet identified by the ID is provided to the Data Link Layer 204 and the moment at which the Network Layer 203 receives DLSuccTrans(ID) from the Data Link Layer 204. This occurs if ID is stored in the register 404.

DLSuccTrans(ID) is the message that triggers this process, which means that the packet has been received by a neighbouring node. The process checks the transmission time $\Delta t_r$, if its value is positive, this is indicative that ID and $ID_b$ match, and a new estimate of the average transmission time $\Delta t_{avg}$ is calculated by a function avgTransmissionTime( ). Regardless of the returned value, the process returns NLSuccTrans(ID) message to the Transport Layer 202 notifying it that the packet was successfully received by a neighbouring node. If the Data Link Layer 204 is unable to send a packet to any neighbouring node, this layer provides message DLFailTrans(ID) to the Network Layer 203. Regardless of whether entries ID and $ID_b$ match or not, which is checked at the beginning of the process, the process returns the NLFailTrans(ID) message to the Transport Layer 202 notifying it that the packet was not received by any neighbouring nodes.

If node K (FIG. 1) has n neighbouring nodes, then each of the n neighbouring nodes is capable of receiving messages transmitted by node K. Thus, the Data Link Layer 204 provides n DLSuccTrans messages to the Network Layer 203. Preferably, only the first DLSuccTrans message triggers $\Delta t_{avg}$ calculation. The remaining messages are still provided to the Transport Layer 202, for which this information may be needed to determine the number of neighbouring nodes. However, those messages no longer trigger $\Delta t_{avg}$ calculation because the transmission time register 404 is already cleared.

Preferably, control message DLFailTrans(ID) is not followed or preceded by any DLSuccTrans(ID) messages. In other words, packet ID is either successfully sent, or no node confirms its reception. The latter case is equivalent to the situation in which the node effectively has no responding neighbouring nodes.

Preferably successfully transmitted packets are used to measure the average transmission time $\Delta t_{avg}$. Preferably this PacketTransmissionResult process is triggered by the reception of Data Link Layer 204 messages, DLSuccTrans(ID) or DLFailTrans(ID), only at the source of the packet they are related to, where corresponding processes at intermediate nodes are different.

PacketFwvdRcv

The PacketFwvdRcv process is for processing data packet P with entries [ID, r, h] by a non-source node K, where this node K receives a data packet from the Data Link Layer 204, which received the packet from a neighbouring node. The PacketFwvdRcv process is illustrated in FIG. 5c.

This process waits for a packet to be provided from the Data Link Layer 204. A packet that propagates through an intermediate node K executes this process. Node K obtains an estimate of the average transmission time from memory 104 and then calls function dupDiscardAlg( ). If the entry corresponding to the received packet already exists in the DD cache 403, then node K has already forwarded that packet to a neighbouring node, and the function returns ret_dupentry.

If the DD cache 403 does not have an entry corresponding to this packet, the function returns ret_newentry. In that case, node K checks the ID of the intended recipient of the packet. If node K is the only destination node of this packet, or one of many, since the packet is broadcast, the packet's payload is provided to the Transport Layer 202. Thus, the packet is received.

If node K is the only destination node of the packet, the process extracts a number of hops h that a packet has traveled and the mobility factor m used for communication session between nodes S and D. These two values, used by the SPD process are stored in the SPD source cache 402 as $\overline{h}$ and $\overline{m}$. These values are then provided back to source S in the traffic from nodes D to S, assuming that node D transmits packets to node S. Of course, this occurs if node K is the sole recipient of a packet. If a packet is broadcast, therefore the SPD source cache 402 is not used because the address of the destination is D=0, and there is no traffic flowing in the reverse direction from other nodes to S, and if node K is the only destination node, the packet is removed from the AHN.

If node K is not an intended recipient of a packet, the process increments the hop counter and checks if the packet had not circulated in the AHN for too long. If the packet does circulate for too long, then it is discarded.

Otherwise, the process calls function subPathDiscardAlg( ), where this function implements the SPD process. The purpose of the SPD process is to further decrease the number of duplicate packets in the AHN. Depending on the outcome of this process, the packet is either discarded or further processed by node K. In the latter case, K relays the packet to its neighbouring nodes.

PacketFwdRcvResult

The PacketFwdRcvResult process is used to determine whether a packet propagating through the node executing this process has successfully been rebroadcast to a neighbouring node, as illustrated in FIG. 5d. The information about the outcome of the transmission is used to calculate the average transmission time. This process is triggered by control messages DLSuccTrans(ID) or DLFailTrans(ID) as received from the Data Link Layer 204. Furthermore, this process is triggered by the ID of the packet not comprising the identification of a node executing this process, which implies that the node executing this process is not the source of the packet.

This process waits for a message from the Data Link Layer 204 directed to the packet ID.

The process is very similar to the process used in the PacketTransmissionResult process. The difference is that PacketFwdRcvResult process does not return any messages to the Transport Layer 202. If the intermediate node cannot forward a packet to further nodes because, for example all neighbouring nodes are gone or a packet has traveled too many hops, the Network Layer 203 does not respond. A response is dependent upon the Transport Layer 202 for overseeing lost packets. The fact that intermediate node K is unable to forward the packet to another node does not imply that the packet will not reach its destination, other nodes may be able to forward the packet to a destination node.

CacheTimer

The CacheTimer process, as illustrated in FIG. 5e, controls entries stored in the DD cache, SPD cache and SPD source cache, where this process is triggered by a time-out of entry [ID, $t_r$] in the DD cache that occurs when the current time is equal to $t_r$. During the time of $\Delta T_r$ since the insertion or refresh of an entry distinguished by ID, no packet with that entry has propagated through the node in execution of this process.

This process executes asynchronously at every node, keeping track of entries stored in the DD cache 403, SPD cache 401 and SPD source cache 402. As soon as the time field in any DD cache 403 entry is equal to the current time, which indicates that the particular entry has expired, the process removes the entry from the DD cache 403. If this is the last entry concerning the communication session from nodes S to D, and from nodes D to S, and the node executing the process is the source node S, the process removes the corresponding entry from the SPD source cache 402. Preferably, source node does not store any information that concerns a communication session that most likely has already finished.

However, deleting an entry with identifications S and D from the SPD cache 401 requires that the DD cache 403 stores no entry with S and D, or D and S, as the identifications of source and destination nodes. An entry in the SPD cache 401 stores information related to packets propagating from nodes S to D and from nodes D to S. As long as at least one entry for this pair of nodes is stored in the DD cache 403, which indicates that a communication session between the two nodes is still active, the corresponding entry is preferably not deleted from the SPD cache 401, since this entry may be still useful for controlling packet traffic. In the above reasoning, it is assumed that expiry of entries in DD cache 403 means that the communication session is closed, however this does not need to be the case.

If there is a temporary gap in a communication session between two nodes, then removing the entry from SPD cache 401 is premature. The expiry of entries in the DD cache 403 does not imply that the communication session is closed.

Preferably a separate timer is introduced for entries in SPD cache 401. This timer depends not only on the packet traffic in the AHN, but on the mobility m of nodes as well. The disadvantage of this approach is that it involves a higher complexity and thus larger memory requirements for the SPD cache 401.

Initially, to simplify the implementation, preferably no timers associated with the DD cache 403 are used to trigger discards from the SPD cache 401. In using this solution entries in the SPD cache 401 are stored as long as there is a memory space for them. A new entry for storage into an already full SPD cache 401, preferably results in a discard of the oldest entry from the cache 401.

Functions

Processes described above invoke the following functions: dupDiscardAlg, getTransmissionTime, subPathDiscardAlg, deterministicDiscard, probabilisticDiscard, and avgTransmissionTime, as illustrated in FIG. 6. These functions implement processes that limit the number of duplicate packets in the AHN, and perform other auxiliary operations.

dupDiscardAlg(ID, r, h, $\Delta t_{avg}$)

The purpose of this function is to determine if the node that executes this function has already received the packet with the given entry, as illustrated in FIG. 6a. If not, the given entry is inserted into the DD cache 403, otherwise the entry in the DD cache 403 is refreshed. Parameters that are provided to this function are the ID of a packet, maximum number of hops, current number of hops, and the average transmission time from this node. The function returns ret_dupentry, if the entry already exists, or ret_newentry if otherwise.

This function processes entries in the DD cache 403. First, it calculates time $\Delta T_r$ at which the entry determined from the given packet is to expire, where the packet's fields r, and h are used for this purpose. The average transmission time $\Delta t_{avg}$ is calculated in PacketFwdRcv or PacketTransmission Processes If the DD cache 403 already has stored therein the entry with ID, this means that the node executing this function has already processed the packet. In that case, the entry in the DD cache 403 is refreshed. In refreshing this entry, the old time is updated with the new calculated time. This is likely to provide a more accurate estimate of the time for which the entry is stored in the cache 403. The function returns ret_dupentry, which informs the calling process that ID is a duplicate.

If the ID does not have a corresponding entry stored in the DD cache 403, a new entry is created and stored in the cache 403. First, however, the function checks whether there is enough memory in the cache 403 for storing of this new entry. If there is no space, the oldest entry that corresponds to the communication session belonging to ID is deleted. In other words, the deleted entry is the one that describes a packet sent by nodes S to D, belonging to communication session s, such that the timestamp $t_r$ is minimum.

If ID is the first packet belonging to its communication session, then the globally oldest entry is deleted.

Finally, the function returns ret_newentr, which informs the calling process that ID is a new packet.

getTransmissionTime(ID, $\Delta t_{avg}$)

This function calculates the time between the moment at which a packet ID is stored in the transmission time register and the current time, as illustrated in FIG. 6b. Parameters that are provided to this function are the ID of a packet and the current estimate of the average transmission time $\Delta t_{avg}$, where this function returns calculated time, or 0, if there is no entry corresponding to the ID in the transmission time register.

This function first checks if the ID passed as an argument matches the identification stored in the transmission time register 404. If it does not, calculation of the transmission time $\Delta t_t$ taken for the Data Link Layer 204 to send that packet is not possible, thus the function returns a 0.

If the identification stored in the transmission time register 404 matches that of the packet, then the transmission time $\Delta t_t$ is calculated. This time is calculated as the time that has elapsed since the storing of ID in the transmission time register 404. This is followed by the calculation of a new estimate of $\Delta T_b$, which is the maximum time for which the entry is stored in the register. This entry is then set to twice that of $\Delta t_{avg}$, and the value is updated by function avgTransmissionTime( ). This preferably assures that the transmission time register 404 entry is not deleted too early. Finally, the transmission time is returned.

subPathDiscardAlg(S, D, h, $\overline{h}$, $\overline{m}$)

The purpose of this function is to use the SPD process to limit the number of duplicate packets flowing from source node S to destination node D, as illustrated in FIG. 6c. Parameters that are provided to this function are the source node S of a packet, its destination node D, number of hops h it has traveled so far, number of hops $\overline{h}$ that the last packet from nodes D to S has traveled, and mobility factor $\overline{m}$, to be used by the SPD process for a communication session from nodes D to S. The function returns ret_discard if the packet for which this function was called is to be discarded, or ret_keep, if the packet is to be kept.

This function implements Sub-optimal Path Discard (SPD) process whose purpose is to limit the number of packets in the AHN that propagate along sub-optimal paths. Every node has stored therein a SPD cache 401, the entries of which store the following fields: [S, D; $h_{sk}$, $C_{ds}$; $h_{dk}$, $C_{sd}$]. A single entry will be used by two sessions: the one from S to D, and the one from D to S. Fields $h_{sk}$ and $C_{ds}$ are used by a S→D communication session, while fields $h_{dk}$ and $C_{sd}$ are used by a D→S communication session.

Figures 6E, 6F, 7:
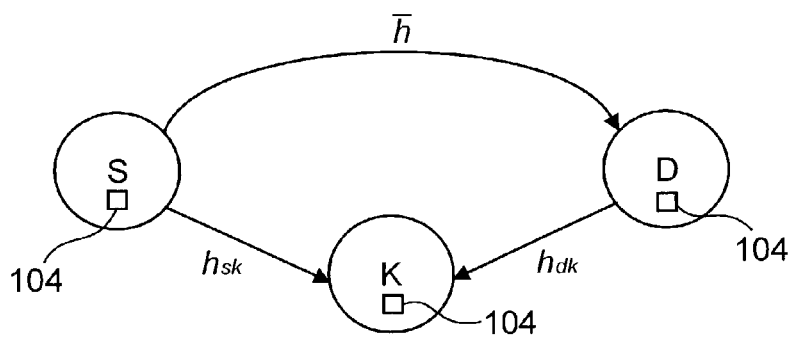
FIG. 6e illustrates a flowchart for the probabilisticDiscard function.
FIG. 6f illustrates a flowchart for the avgTransmissionTime function.
FIG. 7 illustrates three nodes, S, D, and K, with node K disposed between nodes S and D.

FIG. 7 illustrates three nodes, S, D, and K. Node K is disposed between nodes S and D. The intermediate node K receives a packet sent by source node S and is addressed to node D, node K checks whether the SPD cache 401 has stored therein an entry corresponding to a communication session, in either direction, between nodes S and D. If the entry exists, the number of hops $h_{sk}$ that the packet has made so far is stored in that entry, thus overwriting the old value. If the entry does not exist, which means that is the first packet belonging to an S→D communication session, the process creates a new entry with S, D, and $h_{sk}$ set to h, which is the number of hops that a packet has made so far. Remaining fields that are other than S and D, are set to zero.

The process extracts $h_{dk}$ from the SPD cache 401. The positive value of $h_{dk}$ keeps the number of hops between D and K made by a packet propagating from D to S. This entry was previously created in the SPD cache 401 when a packet from D to S propagated through node K at a prior time. If $h_{dk}$ is 0, then this entry has just created in the SPD cache 401.

If $h_{dk}$ is positive, the process calculates the new value for this counter. This calculation starts with an evaluation of two inequalities. In the first, it just checks the value of $\overline{h}$, which is the number of hops taken for the last packet to propagate from D to get to S. This value is inserted into the packet by process PacketFwdRcv and is propagated in the packet sent by nodes S to D.

Furthermore, if this value is positive, the process evaluates another inequality:

$$\overline{h} < h_{sk} + h_{dk}$$

where this inequality checks whether the path $\overline{h}$ of the last packet from D to S, received by S, is shorter than the sum of two paths. These paths are: the current path from nodes S to K made by the packet that is currently being sent, and the old path from D to K made by the last packet sent from nodes D to S, as illustrated in FIG. 7.

A source of a packet is not always aware of a value for $\bar{h}$, that is, the length of the path made by the last packet received from the destination. This occurs, for example, when a source node sends a very first packet in a communication session. In such a case, the source sets set $\bar{h}$ to 0. An intermediate node calculating a discard counter detects this value for $\bar{h}$, and also set it also to 0. This will effectively disable an SPD process, where the SPD process activates as soon as the source receives the first reply from a destination.

Figure 8:
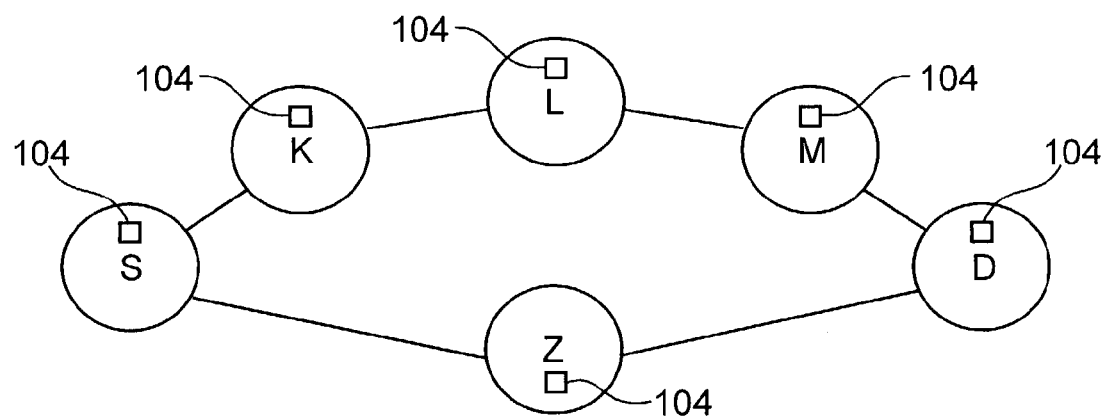
FIG. 8 illustrates nodes S and D, having a first path that involves propagation intermediate nodes K, L and M, and a second path that involves propagation through a single intermediated node Z.

FIG. 8 illustrates nodes S and D, having a first path that involves propagation intermediate nodes K, L and M, and a second path that involves propagation through a single intermediated node Z.

If this aforementioned inequality is met, then it typically implies that packets from node D are reacheable by node S via path shorter than the one propagating through node K. A packet from S to D preferably triggers the above calculation that is further utilized by packet traffic propagating in the opposite direction from nodes D to S.

If the inequality holds the topology of the AHN preferably remains such that node K is not on the shortest path from D to S. This means that node K preferably discards packets sent by D to S, since other nodes located on the shortest path—second path—from D to S relay those packets faster.

An amount of packets for propagating between nodes D and S that are to be discarded depends on the value of discard counter $C_{ds}$. The counter is set to the new value if the above condition holds, where this value is as follows:

$$C_{ds} = \bar{m} \times [(h_{sk} + h_{dk}) - \bar{h}],$$

where $\bar{m} \geq 0$ is a mobility factor carried by the packet.

Note that according to the process $C_{ds}$ is set to zero if $\bar{h}=0$. Assuming that $\bar{h}$ is positive and $\bar{m}=1$, $C_{ds}$ represents a difference in hops between an estimated length of a path that a packet travels between nodes S and D, and the length of the path traveled by the last packet from D to S, which was at the time the shortest path between D to S.

Node K starts discarding packets sent by D to S while at the same time decrementing $C_{ds}$. As soon as $C_{ds}$ becomes 0, node D resumes forwarding of packets that are addressed to node S. Details of this process are implemented in functions deterministicDiscard( ) and probabilisticDiscard( ).

If a packet from node S to D triggers a call to function subPathDiscardAlg( ), like in the case discussed in this section, discard counter $C_{sd}$ is provided to the discard functions. The discard functions decide whether the packet from S to D, for which this function is called, is to be discarded or forwarded.

Note that if subPathDiscardAlg( ) is called with D and S as its arguments, triggered by a packet traveling in the opposite direction from D to S, $C_{ds}$ is provided to these functions, not $C_{sd}$. In such a case, the SPD process calculates a new value of $C_{sd}$ used by a communication session from S to D and then determines whether the packet from D to S should be discarded.

In the meantime, another packet sent by S to D is optionally received by K, and yields $C_{ds} > 0$. This will mean that packets sent from nodes S to D are still following paths shorter than the one via node K. In such a case, according to the process, the old value of $C_{ds}$ is overwritten by the new value.

The discard functions for a packet traffic flowing from S to D are called if the relevant discount counter $C_{sd} > 0$, and the discount counter $C_{ds}$, before the process calculates its new value, is positive.

At some point the value of a discount counter may drop to 0. When that occurs, node K is not only used to relay the packet, but also change the estimate of the shortest path $\bar{h}$ to the length of the path from nodes S to D via node K. This is very important in handling a situation in which the AHN topology change to a deletion of the shortest path. If $\bar{h}$ is not altered, nodes downstream are not be aware of the topology change and keep deleting the packets.

A packet traveling from nodes S to D triggers a calculation of a discard counter later used by the process to determine the fate of a packet traveling from D to S. In other words, traffic from S to D determines the behavior of the SPD process for packets flowing in the opposite direction, from D to S.

A period for which a node discards packets depends on the estimated difference between another path and the shortest path. At any time, topology of the AHN changes and the shortest path is no longer there. If the path difference is large, there is a good chance that other nodes "closer" to the shortest path will pick up the transmission. This potentially results in node K no longer forwarding packets from nodes D to S for a relatively long time.

If this difference is small, node K has less latitude, since any change of topology may place K on the shortest path between S and D. The SPD process preferably functions in the bi-directional packet traffic scenarios. If all the source node does is broadcasts packets, with destination nodes that are acting as passive receivers, this process preferably remains inactive. For example, when node S transmits packets to D and there is no traffic flowing in the opposite direction from D to S, preferably $C_{sd}$ as well as $C_{ds}$, remain with zero values and the process relays all packets from S to D.

Mobility Factor $\bar{m}$

The Mobilityfactor $\bar{m}$ is used in the aforementioned formulas since it has a relation to mobility of packets. In cases of high packet mobility, $\bar{m}$ is preferably set to 0, thus effectively turning off this process. In the case when this process is disabled, TARP relies on a simple Duplicate Discard process implemented in function dupDiscardAlg( ).

Mobility factor $\bar{m}$ is used to determine how many duplicate packets a node is to discard. With increasing $\bar{m}$, the number of packets also increases, making the protocol less reactive to AHN topology changes. This suggests that when the AHN is very mobile, or when a successful packet delivery between a source node and a destination node is preferable, then $\bar{m}$ is set to a small value, with the minimum of 0.

The mobility factor is set dynamically by the TARP, where its value is dependent upon a packet loss perceived as perceived the application 201. If the packet loss becomes high at any time, the application 201 dynamically set m, and thereby $\bar{m}$, to 0, thus forcing the protocol to forward more packets.

The mobility factor is set by node S, and propagated as m in the packet from S to D, and is later returned, as $\bar{m}$, and propagated in the packet from D to S. Traffic from S to D determines behaviours of a process for packets traveling from D to S. If node S is to affect the process, its value is preferably propagated in the packet in the reverse traffic to node S.

In this manner, source S is able to control the operation of the SPD process that limits the number of packets that are on the sub-optimal path. If the process is aware that the mobility of the AHN is low, the process optionally sets m to a higher value, for example that of 2 or 4. If, on the other hand, the source node detects a large number of dropped packets in the AHN, or it is aware that the AHN topology changes are likely to be frequent, m is preferably set to 0, effectively disabling the SPD process, and forcing the intermediate nodes to pass all packets from S to D. This is of course subject to constraints implemented by the DD process described hereinbelow.

As aforementioned, FIG. 8 illustrates a simple AHN topology for the following example. There are two paths between S and D: the shortest 2-hop path occurs via node Z and a longer 4-hop path occurs via nodes K, L, and M. Assuming the mobility factor m=1 and that both S and D transmit packets to each other.

Inspecting the contents of SPD cache 401 entries at nodes K, L, and M, and SPD source cache 402 entries at nodes S and D, as well as relevant packet fields $\bar{h}$ and $\bar{m}$ at several stages of the communication, the following result:

SPD source cache 402 at a source node of the packet are set by process PacketTransmission SPD source cache 402 at a destination node of the packet are set by process PacketFwdRcv SPD cache 401 at an intermediate—transit—node of the packet are set by function subPathDiscardAlg and called by process PacketFwdRcv FIG. 9a illustrates a table showing SPD source cache 402 entries for nodes D and S for a packet p1 sent by D to S and arriving at node S. SPD source cache 402 at node D has not yet received any packet from S, so initially the path $\bar{h}$ from D to S and the mobility factor $\bar{m}$ are set to 0. The SPD source cache 402 at node S has received the packet from D. Assuming that the packet traveling the shortest path via Z arrived and first, the length of the path is 2, since S has learned the mobility factor in node D's application is 1.

FIG. 9b illustrates the SPD cache 401 entries at nodes K, L, and M. The packet traveling from D to S carries values of path and mobility factor $\bar{h}=\bar{m}=0$. The packet has made 1 hop to M ($h_{dm}=1$), 2 hops to L ($h_{dl}=1$), 3 hops to K ($h_{dk}=3$). Since no packet from S to D has been sent yet, the remaining fields of the new entries in the SPD cache 401 entries at three nodes are set to 0. The packet is not dropped because $C_{ds}$ is 0.

FIG. 9c illustrates a reverse of that shown in FIG. 9a, where a packet p2 of a reverse communication session from S to D arrives at node D, where this operation is potentially node S' reply to the receipt of packet p1. Thus, the SPD source cache 402 at node D has received the packet from S. Assuming that the packet traveling the shortest path via Z arrived first, the length of the path is 2. D has learned that the mobility factor in the node S' application is 1. The SPD source cache 402 at node S has the value for the mobility factor and the length of the shortest path $\bar{h}$ from D to S set upon reception of packet p1.

FIG. 9d illustrates the SPD cache 401 entries at nodes K, L, and M, where the packet traveling from nodes S to D carries values of path $\bar{h}=2$ and mobility factor $\bar{m}=1$. The packet has made 1 hop to K ($h_{sk}=1$), 2 hops to L ($h_{sl}=2$), and 3 hops to M ($h_{sm}=3$). The packet carries positive values of $\bar{h}$ and $\bar{m}$, and both conditions, as required by the SPD process for a calculation of the discard counter $C_{ds}$, are fulfilled. This calculation sets $C_{ds}$ to 2 at all intermediate nodes. This value corresponds to the difference—in hops—between the length of the S to D path via nodes K, L, and M, and the shortest path via node Z. Since $C_{sd}$ is still 0, packet p2 traveling from S to D via node K is not dropped until it gets to node D. The Duplicate Discard (DD) process preferably drops packet p2 at node D.

FIG. 9e illustrates SPD cache 401 entries at nodes K, L, and M, where a packet p3 is sent by nodes D to S for arrival at node S, which in turn is potentially seen as D's reply to p2. The entries at SPD source cache 402 at nodes S and D remain unchanged. The packet traveling from D to S carries values of path $\bar{h}=2$ and mobility factor $\bar{m}=1$. The packet has made 1 hop to M ($h_{dm}=1$), 2 hops to L ($h_{dl}=2$), 3 hops to K ($h_{dk}=3$). Packet p3 carries positive values of $\bar{h}$ and $\bar{m}$, and both conditions, according to the SPD process required for a calculation of the discard counter $C_{sd}$, are fulfilled. This calculation sets $C_{sd}$ to 2 at all intermediate nodes.

According to the SPD process, the value of $C_{sd}$ upon arrival of the packet and value $C_{ds}$ are preferably positive in order for a node to call a discard function to discard a packet traveling from D to S. Although $C_{ds}$ is positive, the value of $C_{sd}$ upon the arrival of packet p3 at intermediate node is 0. That is why the packet is preferably not discarded but relayed further.

Assume that $C_{ds}>0$ is sufficient for a node to call a discard function and to possibly drop a packet traveling from D to S. This packet is preferably not dropped immediately by the first neighbouring node of node D, that is, node M, and remaining intermediate nodes K, and L do not see that packet. Thus, preferably node M sets $C_{sd}$ to a positive value, and the other two nodes, unaware of the traffic from D to S, keep $C_{sd}$ set to 0. Recall that $C_{sd}$ is used to discard duplicate packets flowing from S to D. If now node S sends a packet to D, nodes K and L relay that packet because their $C_{sd}$ values are 0. The duplicate packet is thus discarded by node M, that is, the neighbouring node of the packet's destination.

Of course, this approach would waste AHN resources. A packet would be relayed unnecessarily through the AHN, along almost an entire path, only to be dropped by the destination's neighbouring node.

If the SPD process requires both values of discard counters to be positive, all intermediate nodes relay packet p3 from D to S, thus setting a value of the discard counter for the traffic flowing from S to D. Now, duplicate packets sent by S are discarded by node K, which is node S' neighbouring node, rather than node M.

FIG. 9f illustrates the SPD cache 401 at nodes K, L, and M, where a packet p4 of a reverse communication session from nods S to D arrives to node D, where this is potentially node S' reply to packet p3. The SPD source cache entries at nodes S and D, remain unchanged. The packet traveling from S to D carries values of path $\bar{h}=2$ and mobility factor $\bar{m}=1$, therein. It has made 1 hop to K ($h_{sk}=1$). This time, $C_{sd}$ is calculated when packet p3 passes through K from D to S, and is positive. Depending on the discard process used, packet p4 is discarded as a duplicate either with probability 1, if function deterministicDiscard( ) is used, or a positive probability less than 1, when function probabilisticDiscard( ) is used. In any case, $C_{sd}$ is decremented to 1.

FIG. 9g illustrates the SPD cache 401 at nodes K, L, and M, where a packet p5 sent by node D to node S arrives at S, where this is potentially node S' reply to packet p4. The entries in the SPD source cache at nodes S and D remain unchanged. If packet p4 sent from S to D is discarded at K, a copy thereof arrived at node D following the shortest path via node Z. Thereafter, node D replies with packet p5, and this packet finds a positive value of a discount counter $C_{ds}$. A discard function is called and potentially packet p5 is discarded and $C_{ds}$ is decremented. As before, the packet carries values for path $\bar{h}=2$ and mobility factor $\bar{m}=1$.

FIG. 9h illustrates the SPD cache 401 at nodes K, L, and M, where after transmission of packet p6 from S to D, packet p7 from D to S, and packet p8 of a reverse communication session from S to D. The SPD source cache 402 entries at nodes S and D remain unchanged. Packets p6 and p7 have their discard counters both set to 0, which means that packet p8 finds $C_{sd}=0$ at node K. According to the SPD process, a value of $\bar{h}$ in the packet is set to 4, that is, the length of the path between S and D via node K with mobility factor $\bar{m}$ still being 1. The packet is relayed and the value of $\bar{h}$ propagates to nodes L and M. Each of these nodes relays packet p8 because the new, high value of h̄ is such that the inequality deciding whether the packet should be discarded or not does not hold.

Packet p8 is discarded by the destination D. It is discarded because its copy has arrived first following the shortest path via Z. A couple of packet exchanges between D and S reset the discard counters back to positive values because the values of h̄, stored by S and D, still correspond to the length of the shortest path, which is 2.

This mechanism, in some sense, reinitiates the SPD process after the discard counters drop to 0. This is preferable for the AHN to detect a new shortest path. After h̄ in the SPD source caches 402 at nodes S and D is set to 2, node Z turns off. Thus, the shortest path via node Z is gone. Nodes K, L, and M on the other path will not detect this removal of node Z immediately. Thus, nodes K and M discard packets flowing from S to D, and from D to S, respectively, until the discard counters drop to 0. This allows the packets to be relayed over that path and updates the value of h̄ from 2 to 4 at both nodes S and D. This value, carried later in subsequent packets, allows the SPD process to detect the new shortest path—the one that leads through nodes K, L, and M. Without this mechanism, the SPD process potentially consumes more time in order to learn about the AHN topology change and about a new shortest path. After some time, packets are relayed by M and K only to be dropped by node L. Packets finally reach their destinations after the discard counter at node L has dropped to 0.

deterministicDiscard($C_{sd}$)

The purpose of this function is, on the basis of the discard counter stored in the SPD cache, to decide deterministically whether a packet is to be discarded, as shown in FIG. 6d. The Discard counter $C_{sd}$ is provided to the function and the function returns ret_discard if the packet for which this function was called is to be discarded, or the function returns ret_keep, otherwise.

The mobility of nodes in the AHN, and the fact that any node can be turned-off at any time, means that at some point, node K resumes relaying packets from S to D. Otherwise, if the shortest path is gone, node D stops receiving any packets from S. Thus, function implements a deterministic approach to this problem.

If discard counter $C_{sd}$ is positive, it is decremented and the packet is discarded. Otherwise, if $C_{sd}$ is zero, the packet is forwarded. Unless a new packet from D to S changes the value of $C_{sd}$, the node executing this process drops $C_{sd}$ packets. Then, it resumes their forwarding.

probabilisticDiscard($C_{sd}$, $C_{sd}^{init}$)

The purpose of this function, on the basis of the discard counter stored in the SPD cache, is to decide probabilistically whether a packet is to be discarded or not as illustrated in FIG. 6e. Two arguments are provided to the function, namely discard counters $C_{sd}$ and $C_{sd}^{init}$. The function returns ret_discard if the packet for which this function was called is to be discarded, or ret_keep, otherwise.

This function is used for controlling the time for which a node is to initiate a discarding of packets. $C_{sd}^{init}$ is used to store an initial value of $C_{sd}$ calculated by the node for a communication session from S to D, and $C_{ds}^{init}$ for communication session in the opposite direction. Thus, when node K creates a new entry for source S and destination D, or updates an old entry with the h̄ information extracted from the packet traveling from D to S, both $C_{sd}$ and $C_{sd}^{init}$ are set to the same value.

The probabilistic method checks if the discard counter $C_{sd}$ at node K is positive. If the counter is positive, the method decrements it, leaving $C_{sd}^{init}$ intact. However, a decision as to whether that packet is to be relayed or dropped is now based on a random decision. More precisely, the packet is relayed to another node with the following probability:

$$P_{disc} = C_{sd} / C_{sd}^{init}$$

According to this formula, every consecutive packet sent by S to D has a greater probability of being dropped than its predecessor. This means that as time goes by, and no packet from D to S has been observed for resetting the values of $C_{sd}$ and $C_{sd}^{init}$, it is more likely that the AHN topology has changed, thus placing node K on the shortest path from S to D. In such a case, it is potentially preferably to forward the packet with some probability.

avgTransmissionTime($\Delta t_t$)

The purpose of this function is to calculate the average transmission time at the node that calls this function for execution. The function steps are illustrated in FIG. 6f. Arguments that are provided to the function are the last recorded transmission time, where the function returns the new estimate of average transmission time $\Delta t_{avg}$.

The formula used for the calculation gradually decreases the importance of past samples and increases the importance of the recent ones. A bigger $C_{avg}$ puts more emphasis on the history, while a smaller $C_{avg}$ favors recent measurements. Typical acceptable values are between 0.5 and 0.8. The value of $C_{avg}$ is one of the protocol's parameters that is controlled by the application 201 through a mode of operation.

Timeout of DD cache Entries

This method is implemented in order to calculate a time $\Delta T_r$ after which the DD cache 403 timer for a given entry in the cache is to expire. The following parameters are used within this method, where r is the maximum range of a packet expressed in hops. A packet is removed from the AHN when it makes r hops and does not reach the destination. Another parameter h is the number of hops a packet has traveled so far, and $\Delta t_{avg}$ is the average time for a node to successfully transmit a packet to an existing neighbouring node—avgTransmissionTime( )—, where this includes the time for possible retransmissions on lower Network Layers 203.

Every time a packet arrives to node K, that node checks whether the entry corresponding to this packet exists in the DD cache 403 using the dupDiscardAlg( ) process. If the entry does not exist, the new entry corresponding to this packet is created and stored in the cache. The time $\Delta T_r$ after which that entry is discarded is approximated by the following formula:

$$T_r = F(p) \times \Delta t_{avg},$$

where $$p = r - h,$$

is the number of hops that a packet travels before it arrives to the destination, or if the destination cannot be found, before it is discarded. A function F is defined in such a way that:

$$F(p) \in [0, p-1]$$

Function F assumes that a maximum value of p−1 is the maximum allowed number of hops that a packet is left with and is decreased by 1. If by p−1 is multiplied by $\Delta t_{avg}$, it provides a latest time at which the packet returns to the node, assuming that every node has a similar transmission time. Such a returned packet is discarded as a duplicate packet.

Assuming that F(p)=0, the minimum value, the entry corresponding to the passing packet is not stored in the DD cache 403. Such a protocol in fact corresponds to a simple flooding controlled only by the time to live field r for the packet.

Figure 10:
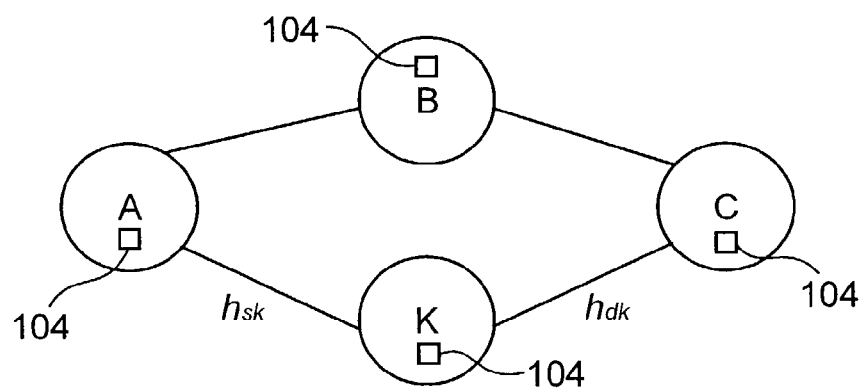

FIG. 10 illustrates an example where setting F(p) to its maximum value of p−1 is potentially beneficial, as outlined hereinbelow. As is shown in FIG. 10, all by p−1 nodes form a loop. Node K forwards the packet that has p=5 hops to live. From this figure it is evident that if node K uses F(p)<p−1 to calculate $\Delta T_r$, the relevant entry is discarded too early. In that case, when the packet gets to node K, after making a full loop, it is forwarded further, which unfortunately wastes AHN bandwidth. In this example it is assumed that node C cannot receive the transmission from K because when that transmission was taking place, node C was too far from node K. On the other hand, if K uses F(p)=p−1, it never forwards a duplicate but instead will reserve more memory for the DD cache 403.

If B or C are in reception range for receiving the transmission from K, then using F(p)<p−1 potentially leads to premature deleting of the relevant entry from the DD cache. Thus, function F potentially depends on its argument p in yet another way. With a large p, the chance that all p nodes form a loop, thus making it more likely for a node to see a packet's duplicate, becomes less probable. On the other hand, if there are just a few nodes, hence a small p, the chance that these nodes form a loop becomes higher. This suggests that when p is small, F(p) should be closer to p−1, than when p is large.

Taking this into consideration, on the average, approximating F(p) by 0.75×(p−1) provides the right compromise between the bandwidth and memory usage. Simulations of some typical scenarios likely show what value of F(p) gives the best results, and how the number of hops that a packet is left with affects the optimal value of F(p). $\Delta t_{avg}$ is measured, stored and updated by every node. In this manner, every node uses its own estimate of $\Delta T_r$.

Of course, it is not necessarily true that every node has the same transmission time, and that is why $\Delta T_r$ is only a rough estimate. Preferably, the entries in the DD cache at the source of a packet are likely kept longest. This occurs because at the source, h=0, and $\Delta T_r$ assumes the maximum value.

TARP Parameters and Their Initial Values

TARP has only five parameters, whose initial values are initially set, where the first two are later maintained by the protocol itself in order to keep their values optimal. The last three are included in protocol modes of operation and are controlled by the application 201 designer or, dynamically, by the application 201 itself.

The first value is the average time $\Delta t_{avg}$ between the moment a packet is passed to the Data Link Layer 204 and the moment at which Data Link Layer 204 notifies the Network Layer 203 if the packet is successfully received by a first neighbouring node. This time is used in calculation of time $\Delta T_r$ for which an entry is stored in the DD cache 403. Assuming knowledge of the maximum packet length L and AHN's capacity C, $\Delta t_{avg}$ is initially approximated by $c \times L/C$, where c>1. The protocol adjusts $\Delta t_{avg}$ to the value closer to the actual average time $\Delta t_{avg}$, using the PacketTransmission process and avgTransmissionTime( ) function. Having $\Delta t_{avg}$=0, will not cause a failure of the TARP.

However, setting $\Delta t_{avg}$=0, results in a premature expiry of the first few entries in the DD cache that leads to more copies of the packets they correspond to circulating in the AHN. Advantageously, the TARP converge to a correct value of $\Delta t_{avg}$.

The second value is the maximum time $\Delta T_b$ for which an entry is to be stored in the transmission time register. It is assumed that the initial value of $\Delta t_{avg}$ is positive, $\Delta T_b$=c× $\Delta t_{avg}$, where c>1 and $\Delta T_b$>>0, otherwise calculating of a good estimate for $\Delta t_{avg}$ is more difficult. This operation is performed using the PacketTransmission process.

The third parameter $C_{avg}$ is used in calculation of the average transmission time $\Delta t_{avg}$.

The value of $C_{avg}$ emphasizes either the past or recent measurements of $\Delta t_{avg}$. According to the formula used to calculate $\Delta t_{avg}$, a node will react slower to changes of the actual transmission time if $C_{avg}$ is too large. Depending upon the environment in which the TARP operates, different values of $C_{avg}$ are potentially optimal. This parameter is potentially controlled by the application through some mode of operation. Preferable values for $C_{avg}$ range between 0.5 and 0.8, thus for example $C_{avg}$ is initially set to 0.65.

The fourth parameter is $\Delta T_r$, where the function F used to determined an approximate timeout $\Delta T_r$ for use in determining when an entry is to be removed from the DD cache 403. Using an aforementioned equation: F(p)=0.75*(p−1) seems to be a right approximation if the amount of memory used within each of the nodes is limited. Otherwise, F(p)=p−1 is safest measure as it assures that minimal bandwidth will be wasted in the AHN. Optionally, this parameter is controlled by the application 201 through a mode of operation.

A fifth parameter is the mobility factor $\overline{m}$, where the mobility factor is used to calculate the value of discount counter used by the SPD process that is further used in function subPathDiscardAlg( ). The default value of $\overline{m}$=1 seems to be a safest discount value with this value closely approximating a difference—in hops—between the current path for packet propagation and the shortest path for packet propagation. Optionally, similar to parameter $C_{avg}$ and function F, the mobility factor is controlled by application 201 through a mode of operation TARP Properties The TARP advantageously allows for further simplification for AHN applications that are used in an undemanding environment. For example, such an environment is a small collection of nodes that are involved in a low-bandwidth communication.

An argument provided to the TARP is used to determine the level of the complexity desired by the application 201. In the simplest case, the flooding on which the TARP is based is controlled only by time to live r for a packet. Thus, there is little need for a DD cache 403 or transmission time register 404. Every node forwards packets addressed to other nodes and receives and removes from the AHN packets addressed to it. Furthermore, packets that circulate in the AHN too long, based on r and h, are also removed. Achieving of simple flooding is accomplished by setting function F(p)=0 and $\overline{m}$=0.

If a simple method of flood control is needed, then F(p)>0 and $\overline{m}$=0 is utilized. This activates the first method that controls the number of packet duplicates traveling in the AHN, but disables the second method that limits the number of packets on sub-optimal paths.

If the bandwidth of the AHN is very scarce, both the DD process and the SPD process are used by setting F(p)>0 and $\overline{m}$>0. In addition to these parameters, a value of parameter $C_{avg}$ used in calculation of the average transmission time $\Delta t_{avg}$, where $\Delta t_{avg}$ is optionally varied depending on the predicted or perceived mobility of the AHN.

Environment of an ad-hoc application, and resulting requirements imposed on the TARP, might be represented as a single "complexity level" parameter. This parameter optionally assumes different values for different combinations of the above three modes of operations. This way, a designer of an ad-hoc application 201 tailors TARP to the needs of the application and its environment.

Advantageously, the TARP is simple over those protocols envisaged in the prior art. The advantages are realized because no routing tables are utilized, no sophisticated methods are employed for maintaining of a route within the AHN once the route is established, and flexibility in reacting to AHN topology changes. Furthermore, control messages exchanged between nodes are very limited, and there are five protocol parameters used for controlling of the AHN.

Replication of a packet at many nodes assures that the packet will get through to a destination node, assuming of course that destination node is not in a disjoint part of the AHN. Advantageously, by discarding duplicate packets through the implementation of the DD process, uncontrolled replication of packets that would quickly occupy most of the AHN's bandwidth, is advantageously reduced. A number of duplicate packets is further limited by the SPD process, which discards packets traveling on sub-optimal paths.

Since the TARP uses controlled flooding, broadcasting is facilitated. Furthermore, duplicate packets do not occupy as large portion of the AHNs bandwidth as do control messages, used in more complex protocols, which are used to assure that packets follow optimal paths. These control messages not only increase the complexity but also involve a significant overhead in terms of wasted bandwidth.

Furthermore, the TARP complexity is further reduced, and its performance improved as a result, because at the Network Layer 203 there are no acknowledgement messages, or any other communication between the destination and the source. The TARP advantageously forwards packets to destinations.

If an application needs a reliable transfer of data, higher levels of the TARP are optionally responsible for handling acknowledgements and retransmissions. This way, if an application does not need a reliable transfer of data, thus for example a packet is broadcast to make another node aware of its existence, the TARP does not waste any bandwidth on acknowledgements.

Finally, the TARP modes of operation provide an easy method of adjusting to different requirements imposed on the AHN.

Numerous other embodiments may be envisaged without departing from the spirit or scope of the invention.

What is claimed is:

1. A method of providing a reactive ad-hoc network comprising the steps of:
providing at least a source node, a first node, a second other node, and a destination node of a plurality of nodes, each node comprising at least a processor, a memory, and a transceiver in communication with the processor for receiving data and transmitting data via a wireless communication medium;
providing a packet of data comprising message data and header data to the processor of the first node for transmission therefrom, the header data comprising data relating to the source node and the destination node for the packet of data, data relating to a number of hops already completed for the packet of data, data relating to mobility of packets of data within the reactive ad-hoc network, data relating to a number of hops between the source node and the destination node for a previous packet of data, and a unique identifier for the packet of data;
transmitting the data from the transceiver of the first node in a broadcast fashion;
receiving the data at the transceiver of the second other node; and
determining an action for the second other node with the processor of the second other node, the action being determined in dependence upon at least the header data, the message data, and at least a predetermined criteria, and other than determined in dependence upon any information relating to at least any other node;
performing the action, the action being at least one of storing the message data within the memory of the second other node, deleting the packet of data, and updating the header data and re-transmitting the packet of data from the second other node with the transceiver of the second other node in a predetermined broadcast fashion, and
determining from the received data with the processor of the second other node whether a path along which the data was transmitted is sub-optimal relative to a previous number of hops and a packet mobility factor; and
wherein the predetermined criteria includes the following:
when the received data has been received in accordance with the path that is determined to be sub-optimal.

2. A method according to claim 1, wherein the predetermined criteria includes whether the message data has been previously received at the second other node.

3. A method according to claim 2, comprising the step of:
determining from the received data whether the path along which the data was transmitted is sub-optimal; and
wherein the predetermined criteria includes the following:
when the received data has been received in accordance with a path that is determined to be sub-optimal.

4. A method according to claim 2, comprising the step of:
determining if the received data has been previously received;
when the received data is other than previously received, storing data relating to the received data, the data for use in determining if subsequent received data received subsequent to the received data is same as the received data.

5. A method according to claim 4, comprising the step of clearing the data relating to the received data after a predetermined period of time from one of when the received data was received and when the data relating to the received data was stored has expired.

6. A method according to claim 1, wherein the first node and the second other node comprise a second memory for storing data relating to the received data and are absent any memory for storing data relating to a route from the first node to the indicated destination node.

7. A method of providing a reactive ad-hoc network comprising the steps of:
providing at least a first node, a second other node, a source node and a destination node of plurality of nodes, each node comprising at least a processor, a memory, and a transceiver in communication with the processor for receiving data and transmitting data via a wireless communication medium;
providing packet data comprising message data and header data to the processor of the first node for transmission therefrom, the header data comprising data relating to the source node and the destination node for the packet of data, data relating to a number of hops already completed for the packet of data, data relating to a number of hops between the source node and the destination node for a previous packet of data, data relating to mobility of packets of data within the reactive ad-hoc network, and a unique identifier for the packet of data; and providing an indication of the destination node;

transmitting the data from the transceiver of the first node to the transceiver of the destination node without modification via the second other node other than the first node or the destination node absent a known available route; and determining from received data with the processor of the destination node whether a path along which the data was transmitted is sub-optimal, the determination being made relative to a previous number of hops, a packet mobility factor and at least a predetermined criteria; and wherein the predetermined criteria includes the following:

when the received data has been received in accordance with the path that is determined to be sub-optimal.

8. A method according to claim 7, wherein the step of transmitting is performed absent a predetermined known available route.

9. A method according to claim 7, wherein the step of transmitting is performed absent a prior step of determining a route from the first node to the destination.

10. A method according to claim 9, wherein the step of transmitting is performed absent a step of establishing an available communication path along a known route.

11. A method according to claim 10, wherein the step of transmitting is performed absent a step of maintaining the determined route during the communication.

12. A method according to claim 9, wherein the step of transmitting is performed absent a step of determining an approximately optimal route.

13. A method according to claim 7, wherein the step of transmitting is performed absent a step of establishing an available communication path along a known route.

14. A method according to claim 13, wherein the step of transmitting is performed absent a step of maintaining an established route during the communication.

15. A method according to claim 7, absent the step of transmitting an acknowledgement message from the destination node to the first node.

* * * * *